United States Patent
Cao et al.

(10) Patent No.: US 12,531,899 B1
(45) Date of Patent: Jan. 20, 2026

(54) TECHNIQUES FOR BOT DETECTION

(71) Applicant: Amazon Technologies, Inc., Seattle, WA (US)

(72) Inventors: Zhiyuan Cao, Seattle, WA (US); Yutong Chen, Redmond, WA (US); Leah Autumn Thompkins, Seattle, WA (US); Min Shi, Sammamish, WA (US); Jiajin Li, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 349 days.

(21) Appl. No.: 18/121,952

(22) Filed: Mar. 15, 2023

(51) Int. Cl.
*H04L 9/40* (2022.01)
*H04L 43/04* (2022.01)

(52) U.S. Cl.
CPC .......... *H04L 63/1483* (2013.01); *H04L 43/04* (2013.01)

(58) Field of Classification Search
CPC .................................................. H04L 63/1483
See application file for complete search history.

(56) References Cited

U.S. PATENT DOCUMENTS

| | | | | |
|---|---|---|---|---|
| 8,997,226 | B1 * | 3/2015 | Call | H04L 63/1483 709/224 |
| 9,906,544 | B1 * | 2/2018 | Kurupati | H04L 63/1416 |
| 10,587,636 | B1 * | 3/2020 | Aziz | H04L 63/145 |
| 10,771,398 | B1 * | 9/2020 | Cernoch | H04L 67/60 |
| 11,386,349 | B1 * | 7/2022 | Prisadnikov | G06N 20/00 |
| 2008/0270546 | A1 * | 10/2008 | Morris | G06Q 10/10 709/206 |
| 2010/0070620 | A1 * | 3/2010 | Awadallah | H04L 63/1425 709/224 |
| 2015/0095268 | A1 * | 4/2015 | Greenzeiger | G06Q 10/06311 706/11 |
| 2015/0326587 | A1 * | 11/2015 | Vissamsetty | H04L 63/1416 726/23 |
| 2015/0379266 | A1 * | 12/2015 | McLaughlin | H04L 63/14 726/23 |
| 2016/0005029 | A1 * | 1/2016 | Ivey | G09C 1/00 705/44 |
| 2016/0134639 | A1 * | 5/2016 | Kaminsky | H04L 63/126 726/3 |
| 2016/0277429 | A1 * | 9/2016 | Demirjian | G06F 21/36 |
| 2017/0193526 | A1 * | 7/2017 | Turgeman | G06Q 30/0185 |
| 2018/0103047 | A1 * | 4/2018 | Turgeman | G06Q 20/4014 |

(Continued)

*Primary Examiner* — Khang Do
(74) *Attorney, Agent, or Firm* — Kilpatrick Townsend & Stockton LLP

(57) ABSTRACT

Techniques are provided herein for detecting bot activity. Tasks associated with one or more delivery sub-tasks can be provided to various user devices. The task requests received from the user devices can be processed according to a variety of factors to determine a likelihood that the task requests were initiated by a bot. In some embodiments, transient tasks (e.g., task that are deleted within a relatively short period of time and for which a user device cannot be assigned) may be utilized at any suitable time. User devices that request assignment of such transient tasks may be identified as using a bot, or at least the probability identified for those user devices can be increased, indicating a heightened likelihood that the user device is using a bot. A number of remedial actions can be executed when the likelihood that the user device is using a bot exceeds a threshold.

20 Claims, 7 Drawing Sheets

(56) References Cited

U.S. PATENT DOCUMENTS

| | | | |
|---|---|---|---|
| 2018/0234447 A1* | 8/2018 | Mueen | G06F 16/2255 |
| 2019/0394333 A1* | 12/2019 | Jiron | G06F 21/32 |
| 2020/0028874 A1* | 1/2020 | Lam | H04L 63/145 |
| 2020/0137073 A1* | 4/2020 | Palan | H04L 63/1475 |
| 2020/0293988 A1* | 9/2020 | Rehn | G06Q 10/0834 |
| 2020/0304521 A1* | 9/2020 | Jiang | H04L 63/1416 |
| 2020/0410082 A1* | 12/2020 | Sharieh | G06F 16/54 |
| 2021/0027181 A1* | 1/2021 | Roden | G06F 21/604 |
| 2022/0116481 A1* | 4/2022 | Katta | H04L 63/1416 |
| 2022/0230178 A1* | 7/2022 | Tate | G06F 16/9024 |
| 2022/0321563 A1* | 10/2022 | Keller | G06N 5/04 |
| 2022/0417266 A1* | 12/2022 | Muthiah | H04L 63/1441 |
| 2023/0104757 A1* | 4/2023 | Pramod | G06N 3/0475 |
| | | | 706/11 |
| 2024/0195801 A1* | 6/2024 | Novick | G06Q 40/02 |
| 2024/0211559 A1* | 6/2024 | Chen | G06F 21/316 |
| 2025/0077634 A1* | 3/2025 | Knox | G06F 21/32 |

\* cited by examiner

TECHNIQUES FOR BOT DETECTION

BACKGROUND

Bot abuse occurs when a computing agent, script, or software tool is used to generate automated web requests to manipulate, defraud, or disrupt a website, application, application programming interface (API), or end-users. Detecting bot usage is challenging because these automated web requests may be difficult to differentiate from genuine, legitimate user requests. Failing to detect this type of abuse can result in wasted processing resources, wasteful messaging, system delays, which in turn can result in a suboptimal user experience.

BRIEF DESCRIPTION OF THE DRAWINGS

Various embodiments in accordance with the present disclosure will be described with reference to the drawings, in which.

DETAILED DESCRIPTION

Figure 1:
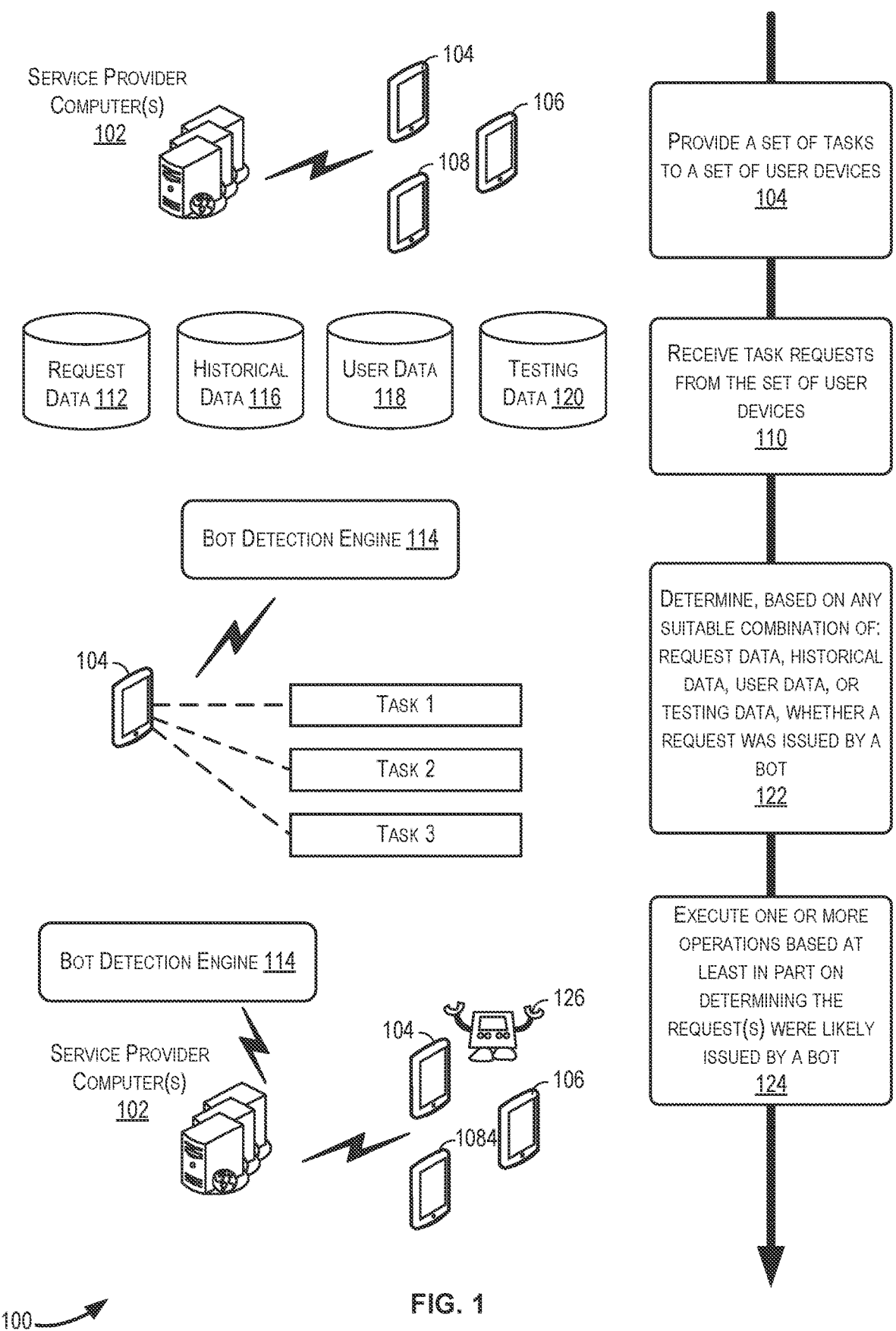
FIG. 1 is a flow for an exemplary process for detecting bot usage, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A service provider may host an application in which a number of tasks may be presented to users. As a non-limiting example, a service provider may be an online retailer that provides tasks (e.g., delivery opportunities) associated with a particular time period (e.g., a time period during which the user plans to deliver items on behalf of the service provider to various destinations) and a particular location (e.g., a warehouse operated by or on behalf of the service provider). The user interfaces provided by the application may be used to search for and filter various tasks until one of interest is found. The user may submit a request via the application to request that the task be assigned to them. The system can utilize a variety of predefined rules to identify whether to allow or deny the request. If allowed, the task can be associated with the user and the user interface can be updated to reflect the same. In the context of the ongoing example, the user can arrive at a designated time associated with the task (e.g., 15 minutes before a start time associated with delivering items corresponding to the task), perform the sub-tasks associated with the task (e.g., deliver a set of packages), and indicate via the app when these sub-tasks have been completed. The service provider may, in some cases, provide compensation to the user for completing the sub-tasks associated with the task.

In some cases, users of this and similar applications can utilize computing agents (e.g., "bots") that are configured to issue automated requests that simulate genuine, human initiated requests. A "bot" is intended to refer to any suitable computing agent, script, or software tool that is configured to generate automated web requests that simulate genuine user requests (e.g., to manipulate, defraud, or disrupt a website, application, application programming interface (API), or end-users). A bot may be used to ensure that a user acquires as many tasks (e.g., tasks associated with delivery opportunities, also referred to as "blocks") as possible, obtains the most advantageous tasks, drives up compensation amounts associated with remaining tasks, disrupts the system, among other reasons. Bot usage enables fraudulent practices to exist and can discourage other users from using the system by depleting the tasks from the available pool, leading those users to believe there are no, or substantially fewer, tasks available.

In some cases, a fraudulent user may utilize a bot to greedily request a variety of tasks. The user may then review the task(s)/sub-task(s) assigned, determine one that is most advantageous, and release the other tasks. This practice can cause significant processing resource waste as the system processes the initial requests, assigns multiple tasks, and then later processes the cancellations to update those tasks to indicate they are once again available. Other users who are not engaging in these fraudulent activities can experience delayed system performance and a diminished user experience as the fraudulent requests can cause the available pool of tasks to appear significantly smaller than it realistically is. Additionally, response times for non-fraudulent users can be significantly increased from what they otherwise would be if processing of these fraudulent requests was reduced or avoided entirely.

A task management and detection system is disclosed that is configured to manage tasks and/or detect bot usage from received task requests. In some embodiments, a set of tasks corresponding to a particular location (e.g., a particular warehouse) may be identified/managed by the disclosed system, or a different system may be configured to identify those tasks. A "task," as used herein may be associated with any suitable task metadata such as: a time period (e.g., 10:00 AM-12:00 PM), a location (e.g., a building, warehouse, a city, etc.), a set of sub-tasks (e.g., item deliveries), sub-task metadata (e.g., item delivery information such as an item identifier, a sender address, a delivery address, item specific requirements such as refrigeration needed, and/or any suitable information related to delivering a physical item to a physical location), routing information (e.g., identifying a delivery route for the items), an amount (e.g., a compensation amount which will be remitted to the user after satisfactory completion of the task), or any suitable combination of the above.

The disclosed system can maintain historical data (e.g., historical requests, indications of whether those historical requests were identified as being generated by a bot, etc.) as well as user data (e.g., user's name, age, demographic information, historical records of past sub-task/task performance, or the like). Any suitable combination of the current request, historical data, and user data may be utilized by the system to determine a likelihood that the request has been generated by a bot versus a legitimate user. By way of example, the system may utilize frequency-based detection techniques, context-based detection techniques, time-based detection techniques, pattern-based detection techniques, address-based (or location-based) detection techniques, credential-based detection techniques, and user specific detection techniques. The particulars of these techniques will be discussed in further detail with respect to FIG. 4.

In some embodiments, the system may be configured to generate transient tasks (e.g., phantom blocks). These transient tasks can be utilized to detect bot usage. While a typical task may be configured to persist (e.g., in an availability pool or otherwise indicated as being available) until assigned to a user, the system may be configured to delete transient tasks in a relatively short period of time (e.g., 2 seconds, 3 seconds, etc.) after initially indicating the task is available (also referred to as "posting"). The speed at which these transient tasks are posted and then deleted can be helpful in identifying potential bot usage. For example, the system can be configured to determine that any requests for these transient tasks may be a signal of potential bot usage. These transient tasks can be used at any suitable time. For example, at least one transient task could be included in any suitable set of genuine tasks. In some embodiments, the system may direct one or more transient tasks to a user that is already suspected of bot usage. In these situations, the system could then track the user's behavior with respect to that transient task(s), using any subsequent request for those transient task(s) to be a further indication that the user is utilizing a bot.

The system can utilize any suitable combination of the aforementioned techniques to identify an overall probability that a given request was generated by a bot, and if so, a number of remedial actions can be employed. In some embodiments, the system may be configured to automatically deny one or more subsequent requests from the corresponding device, modify properties of the tasks (e.g., reduce a compensation amount, increase time period lengths, modify delivery routes, modify particular packages, or otherwise diminish the benefits of performing the sub-tasks associated with the task), or the like.

By utilizing the techniques disclosed herein, the system can directly, or indirectly, reduce wasteful processing resource usage stemming from processing these fraudulent, bot-generated requests. The system could reject these requests outright (e.g., for some time period, for a number of subsequent requests, etc.) and/or disincentivize the use of bots as a whole. By doing so, less processing resources are wastefully utilized, response delays are reduced, unnecessary scheduling fluctuations (potentially resulting in wasteful processing of downstream systems) are reduced or avoided entirely, all while ensuring that the experiences of other users are not diminished by these fraudulent acts.

Moving on to FIG. 1 which illustrates a flow 100 for an exemplary process for detecting bot usage, in accordance with at least one embodiment. The flow 100 may be performed by the service provider computer(s) 102, which may be operated for or on behalf of a service provider (e.g., an online retailer, a delivery provider, a task coordinator, or the like). Although examples provided herein refer to a delivery context, it should be appreciated that the same techniques may be similarly utilized in other contexts. The service provider computer(s) 102 may be configured to manage a set of tasks. As discussed herein, a task may correspond to a time period and a location. In some embodiments, a task may be associated with any suitable task metadata including, but not limited to: a task identifier, a date (e.g., Mar. 17, 2023), a time period (e.g., 10:00 AM-12:00 PM), a location (e.g., a building, warehouse, a city, etc.), a set of sub-tasks (e.g., one or more item deliveries), sub-task metadata (e.g., item delivery information such as an item identifier, a sender address, a delivery address, item specific requirements such as refrigeration needed, and/or any suitable information related to delivering a physical item to a physical location), routing information (e.g., identifying a delivery route for the items), an amount (e.g., a compensation amount which will be remitted to the user after satisfactory completion of the task), a task persistency indicator (e.g., a value or label indicating the task is to persist as available until assigned or the task is to be transitory and deleted or otherwise indicated as unavailable after a predetermined period of time), or any suitable property or attribute that specifies an aspect of the task and/or sub-tasks associated with the task. By way of example, a service provider may identify a number of tasks (e.g., a number of blocks/shifts needed for delivery drivers) for a given day, at a given location (e.g., a warehouse) based at least in part on the number and/or particular items that are expected to be delivered from that location, on that day.

The flow 100 may begin at 104, where the service provider computer(s) 102 may provide a set of tasks to a set of user devices (e.g., user devices 104, 106, and 108). Each task may be associated with an identifier that uniquely identifies that task from other tasks of the system. In some embodiments, the service provider computer(s) 102 may be configured to broadcast these tasks such that the same task(s) and/or task metadata (including the task identifier) is provided to each device. In some embodiments, the service provider computer(s) 102 may target user devices such that task(s) and/or corresponding task metadata differs between user devices. In some embodiments, the service provider computer(s) 102 may provide the set of tasks based on a predefined schedule or periodicity, or in response to task availability requests submitted by the user device 104, 106, and/or 108. In some embodiments, a task availability request used by a user device may include at least a day and/or a location. The set of tasks to be provided in response to these availability requests may be determined based at least in part on matching at least a day and/or location of the request to a day and/or location of a given task.

At 110, one or more task requests may be received from the set of user devices. A task request may include any suitable combination of 1a) the task identifier received in the task at 104, 2) a requestor identifier (e.g., an alphanumeric identifier, an Internet Protocol (IP) address, a device location, or the like) associated with a given user device and/or user corresponding to the task request, or 3) any suitable data associated with the task, the user, or the user device. Received task requests (e.g., request data 112) can be stored for subsequent use and/or provided to the bot detection engine 114.

The bot detection engine 114 may operate as part of the service provider computer(s) 102. In some embodiments, the bot detection engine 114 may be configured to perform a variety of operations to determine whether the received task request(s) were likely to have been generated by a bot. The bot detection engine 114 may manage or obtain any suitable combination of request data 112, historical data 116, user data 118, and/or testing data 120. The historical data 116 may include any suitable information associated with historical task posts and/or requests of any suitable timeframe (e.g., the last year, the last month, etc.). In some embodiments, historical metadata may be generated from historical data 116 through time series analysis and/or any suitable data mining techniques to identify time periods, days, or other conditions which are associated with higher levels of bot usage. By way of example, the historical metadata may indicate that Sunday evenings, from 6:00 PM until 10:00 PM has historically been a day and time at which bot usage has been determined to be relatively high (e.g., over some threshold number of instances of bot issued request has been suspected and/or confirmed). In some embodiments, the historical data 116 may include information indicating which historical tasks were requested by users and when/if those tasks were released or otherwise canceled by those users.

User data 118 may include any suitable data associated or corresponding to the user. As a non-limiting example, user data 118 may include a user profile that is managed by the service provider computer(s) 102. The user data 118 may include any suitable information such as the user's name, location, and the like. In some embodiments, the user data 118 may include historical performance records indicating past task/sub-task performance by the user. In some embodiments, the user data 118 may include information indicating which historical tasks were requested by a particular user and when/if those tasks were released or otherwise canceled by that user.

Bot detection engine 114 may be configured to generate or otherwise obtain testing data 120. Testing data 120 may include any suitable number of transient tasks (also referred to herein as "phantom blocks") which are intended to appear as a legitimate task when posted/provided, but are deleted shortly thereafter (e.g., within 2 seconds of posting/providing to a user device, within 3 seconds, etc.). In some embodiments, the service provider computer(s) 102 may be configured to provide one or more transient tasks at any suitable time and delete those tasks according to any predetermined frequency/regularity or schedule. Testing data 120 may include records identifying these transient tasks.

At 122, the bot detection engine 114 may be configured to determine whether a task request was issued by a bot. The bot detection engine 114 may be configured to make this determination based at least in part on any suitable combination of the request data (corresponding to a most recent request received from a user device), historical data 116, user data 118, or testing data 120. Specific operations for determining whether a given task request was likely initiated by a bot are discussed in further detail with respect to FIG. 4. As a non-limiting example, the bot detection engine 114 may be configured to determine that a request from user device 104 for task 1 (a persistent/legitimate task) was likely issued by a user and not a bot, while other requests submitted by the user device 104 for tasks 2 and 3 (both transient tasks, configured to deceive bots) were likely initiated by a bot. Any suitable number or combination of these determinations corresponding to the requests for tasks 1, 2, or 3 may be utilized to identify a likelihood that the user device 104 is, at least some of the time, executing a computing agent, script, or computer program (collectively referred to as a "bot"). As a non-limiting example, based on the request data 112, historical data 116, the user data 118, and the testing data 120, the bot detection engine 114 may determine that the request for task 1 was likely initiated by a human. The bot detection engine 114 may later determine that the request for task 2 and/or task 3 were likely initiated by a bot (e.g., because the respective request is for a transient task that is unlikely to have been seen by an actual human, because of subsequent behavior by the user such as releasing/canceling the respective task with a predetermined period of time, e.g., within 5 minutes, 30 minutes, etc.).

The bot detection engine 114 may calculate a probability value indicating the likelihood that the user device 104 is executing a bot at any suitable time and according to any suitable data. For example, the bot detection engine 114 may calculate a probability value (e.g., 0%, 5%, etc., indicating a low likelihood that the user device 104 is utilizing a bot) based at least in part on the request for task 1 and any suitable combination of the request data 112, historical data 116, the user data 118, or the testing data 120. The bot detection engine 114 can calculate a new probability value indicating a higher likelihood (e.g., 50%, 90%, 100/6, etc.) that the user device 104 is executing a bot based at least in part on the request for task 2, the request for task 1, and any suitable combination of the historical data 116, the user data 118, or the testing data 120. Likewise, the bot detection engine 114 can calculate yet another probability value indicating the same or an even higher likelihood (e.g., 50%, 90%, 100%, etc.) that the user device 104 is executing a bot based at least in part on any suitable combination of: the request for task 3, the request for task 2, the request for task 1, and/or any suitable combination of the historical data 116, the user data 118, or the testing data 120.

At 124, the service provider computer(s) 102 and/or the bot detection engine 114 may execute one or more operations based at least in part on determining the request(s) received by user device 104, for example, were likely issued by a bot (e.g., that the user device 104 is likely utilizing a bot, such as bot 126). By way of example, the bot detection engine 114 and/or the service provider computer(s) 102 may execute operations to automatically deny one or more subsequent requests from a user device suspected of utilizing a bot (e.g., user device 104). Subsequent requests could be denied for a predetermined period of time. In some embodiments, some percentage (e.g., 100%) of the requests received from a user device suspected of bot usage may be automatically denied for a first time period (e.g., 24 hours, one week, etc.), and then a smaller percentage (e.g., 80%) of requests received from that user device may be automatically denied for a second time period (e.g., the next 24 hours, the next week, etc.), such that the number/percentage of denied requests may decrease over time. In some embodiments, automatic denials may be suspended after a predetermined number of denials and/or a predetermined time.

Figure 2:
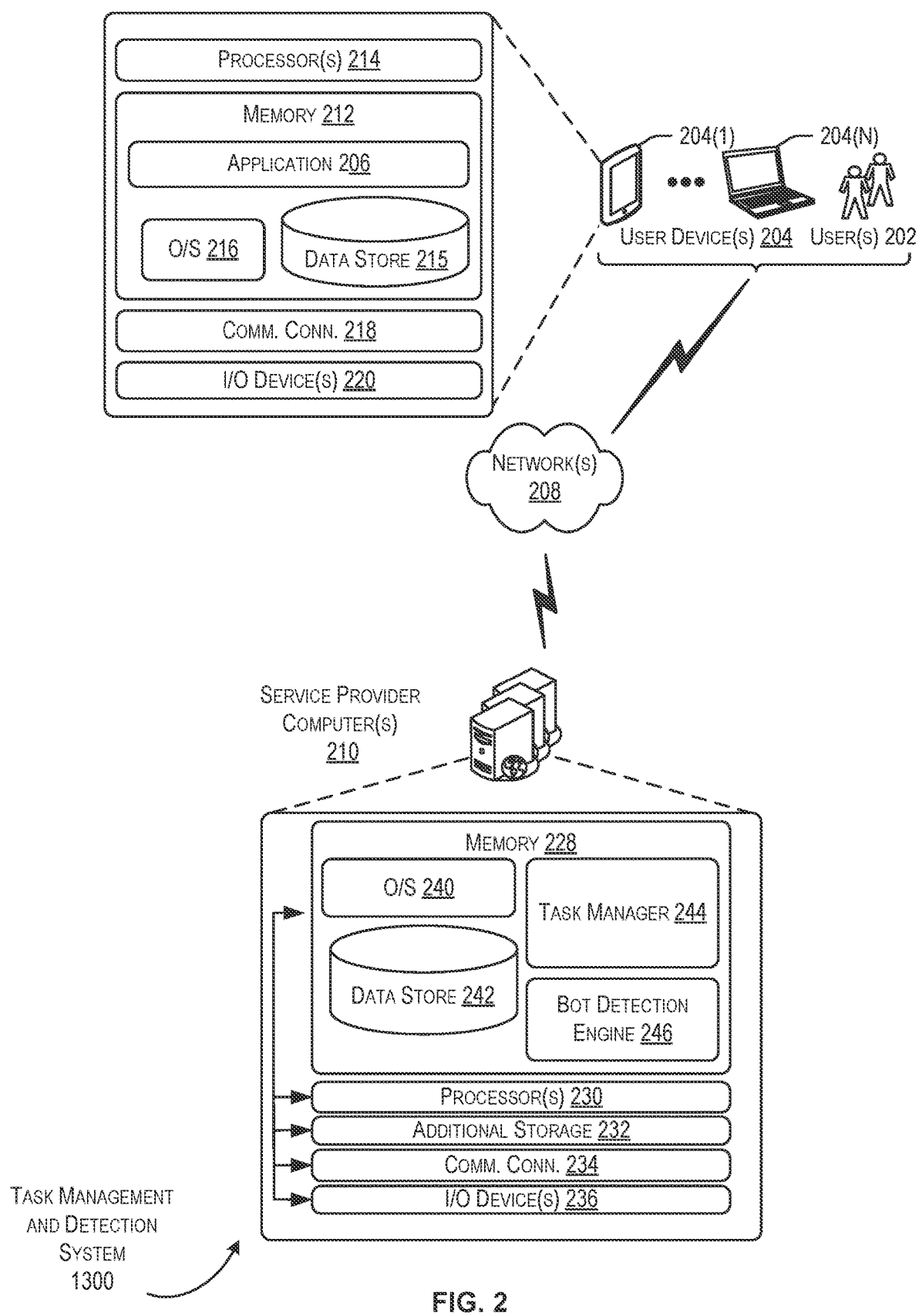
FIG. 2 illustrates components of a workflow management and detection system, in accordance with at least one embodiment.

FIG. 2 illustrates components of a task management and detection system 200 according to a particular embodiment. In some aspects, the application 206 operating on the user device(s) 204 may provide content that can be hosted, managed, and/or provided by a computing resources service or service provider, such as by utilizing one or more service provider computer(s) 210. Application 206 may be configured to present any suitable number of user interfaces for providing user data (e.g., name, address, banking information for compensation, preference data, etc.), searching for and/or requesting tasks, viewing task metadata, cancelling tasks, reporting status of a task and/or sub-task associated with the task, or the like.

Figure 3:
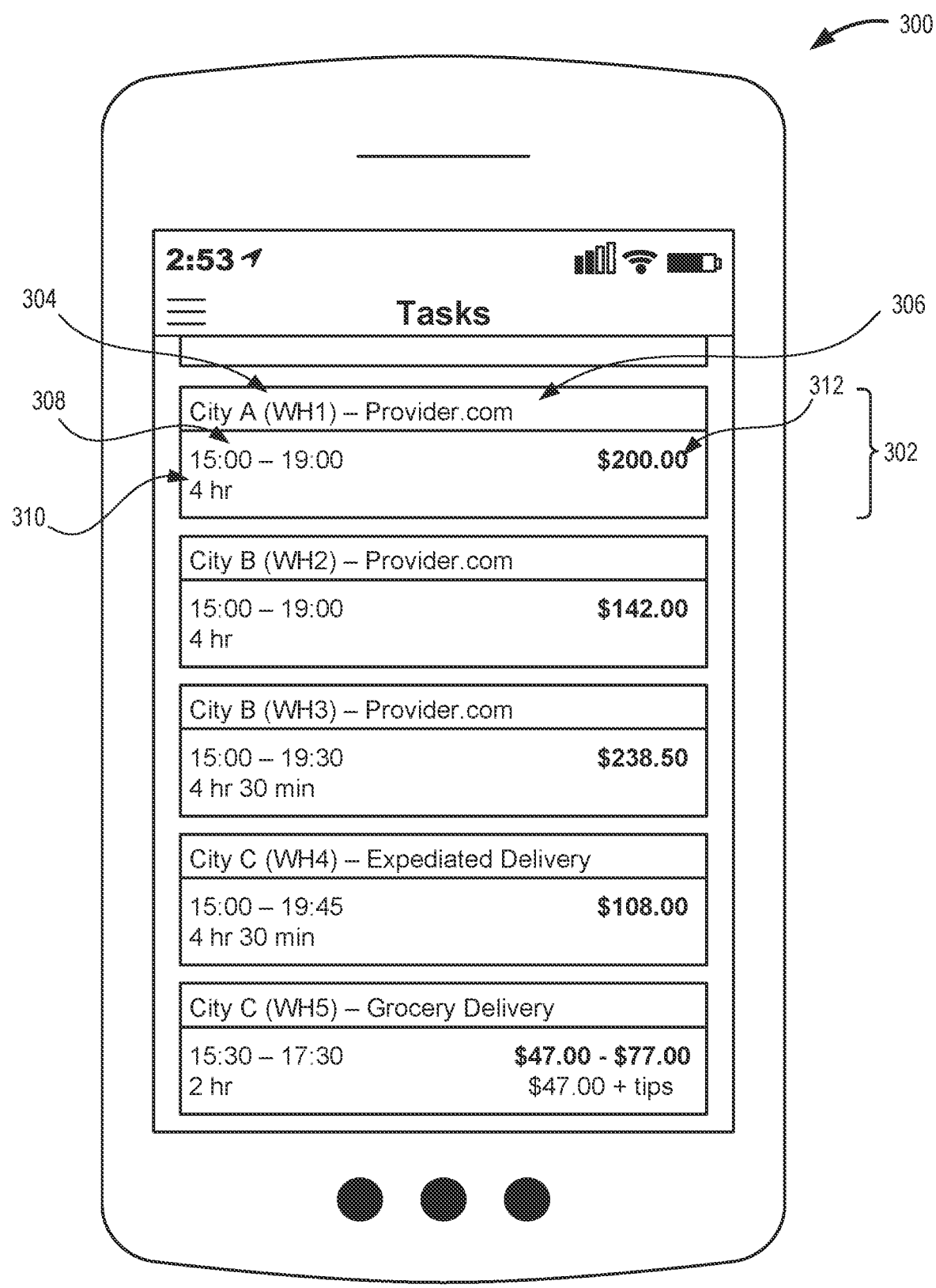
FIG. 3 is an exemplary user interface for presenting various tasks to a user, in accordance with at least one embodiment.

FIG. 3 is an exemplary user interface 300 for presenting various tasks to a user, in accordance with at least one embodiment. User interface 300 is one of many user interfaces utilized by the application 206 of FIG. 2 and hosted by the service provider computer(s) 210 of FIG. 2. At least some of the interfaces provided by the application 206 can enable a user to: enter one or more locations (e.g., one or more locations corresponding to respective delivery pickup locations such as warehouses), a date, a time period, one or more preferences (e.g., time of day, day of the week, preferred task properties such as a minimum compensation rate/amount, a task category (e.g., grocery delivery, package delivery, expedited delivery, and the like), or any suitable searching criteria. These inputs can be used to identify a set of tasks as discussed in FIG. 1 at 104. User interface 300 may be used to present search results (e.g., tasks that match the searching criteria from all available tasks (e.g., all available tasks associated with a particular location/delivery pickup location). In some embodiments, the user may previously designate one or more locations (e.g., pickup locations) which are of interest to the user. In some embodiments, the application 206 may request available tasks for those designated locations at any suitable time or according to any suitable predetermined frequency/regularity or schedule. Tasks broadcasted by the task manager 244 of FIG. 2 (broadcasted or directed/addressed tasks) may be presented at user interface 300.

As depicted in FIG. 3, user interface 300 presents information corresponding to a number of posted tasks including information corresponding to task 302. Any suitable task metadata corresponding to a may be presented via user interface 300. As depicted, the user interface 300 presents location information 304 (e.g., a city "City A," and a delivery pickup location "WH1"). Location information can include any suitable number and type of identifiers corresponding to a city, a pickup address, a location, or the like. As depicted, task 302 includes task category information 306. Task category information may include any suitable indication of a type or category associated with the task such as "Provider.com" (e.g., indicating standard item delivery), "Expediated Delivery" (e.g., indicating the task relates to providing expedited deliver), "Grocery Delivery" (e.g., indicating the delivery sub-tasks for the task include delivering perishable items), and the like.

As depicted in FIG. 3, user interface 300 presents a start time and/or expected end time and an expected time duration for the task (collectively referred to as "block information"). By way of example, task 302 includes block information 308 (indicating a start time of 3:00 PM and an expected end time of 7:00 PM) and block information 310 (e.g., indicating the sub-tasks associated with the task are expected to take 4 hours to complete).

User interface 300 may be used to present various amounts and/or range values corresponding to compensation related to performing the sub-task(s) associated with a task (e.g., $200.00, $47.00-$77.00 ($47.00 base pay+tips), etc.). By way of example, user interface 300 presents compensation value of $200.00, indicating the user who completes the sub-task(s) associated with task 302 will receive $200.00 for completing the sub-task(s) associated with task 302 (e.g., delivery of twenty packages within the time period indicated by block information 308).

Although not depicted in FIG. 3, user interface 300 may be configured to present any suitable task metadata corresponding to any suitable number of tasks. For example, although not depicted, sub-task metadata (e.g., any suitable attribute and/or identifier of an item to be delivered, an address to which the item is to be delivered, delivery instructions for the item, etc.) routing information (e.g., a route identified for performing the sub-task(s) associated with the task), and the like may be presented via the user interface 300 (or another user interface hosted by the service provider computer(s) 210). In some embodiments, tapping (or otherwise selecting) any suitable portion of the area in which the information corresponding to task 302 is presented may be considered user input indicating a selection of the task 302. In some embodiments, the user may be presented additional task metadata based on that selection, or the selection itself may be considered user input indicating the user's desire to perform the task. In some embodiments, receiving such user input may cause the application 206 to transmit a task request to the service provider computer(s) 210. Task manager 244 and/or bot detection engine 246 of FIG. 2 may be configured to process such requests.

Returning to FIG. 2, user input provided via user interfaces (e.g., user interface 300 of FIG. 3) presented at application 206 may be transmitted by the application 206 to service provider computer(s) 210 (e.g., to task manager 244 and/or to bot detection engine 246, operating in whole, or in part, as part of service provider computer(s) 210).

In some embodiments, the task manager 244 may be configured to identify a set of available persistent/legitimate tasks (e.g., delivery shifts for delivering a set of items from a given warehouse to nearby destinations) and manage posting/distribution of said tasks according to a predetermined schedule or frequency/regularity, in response to task requests, or the like. In some embodiments, the task manager 244 may manage any suitable operations for managing legitimate/persistent tasks and any suitable operations for processing response to said tasks.

In some embodiments, the bot detection engine 246 may be configured to execute any suitable operations for managing posting/distribution transient tasks (e.g., phantom/fake blocks/tasks intended to deceive bots) and any corresponding responses to such tasks. The bot detection engine 246 may execute any suitable operations for detecting bot usage by one or more requesting user devices based on a number of techniques discussed in further detail in connection with FIG. 5.

The user device(s) 204 and the service provider computer(s) 210 may communicate via network(s) 208. In some examples, the network(s) 208 may include any one or a combination of many different types of networks, such as cable networks, the Internet, wireless networks, cellular networks, and other private and/or public networks. While the illustrated example represents the user(s) 202 accessing application functionality over the network(s) 208, the described techniques may equally apply in instances where the user(s) 202 interact with the service provider computer(s) 210 via the one or more user device(s) 204 over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 210, perhaps arranged in a cluster of servers or as a server farm, may host the application 206 operating on the user device(s) 204 and/or cloud-based software services. Other server architectures may also be used to host the application 206 and/or cloud-based software services. The application 206 (e.g., a messaging application associated with SMS/MMS/chat messages, etc.) operating on the user device(s) 204 may be capable of handling requests from the user(s) 202 and serving, in response, various user interfaces that can be rendered at the user device(s) 204 (e.g., any suitable user interface related to searching, requesting, canceling, or executing various tasks).

The user device(s) 204 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 204 may be in communication with the service provider computer(s) 210 via the network(s) 208, or via other network connections.

In one illustrative configuration, the user device(s) 204 may include at least one memory 212 and one or more processing units (e.g., processor(s) 214). The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of user computing device, the memory 212 may be volatile (such as random access memory (RAM)) and/or non-volatile (such as read-only memory (ROM), flash memory, etc.). The user device(s) 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system 216, one or more data stores 215, and one or more application programs, modules, or services for implementing the techniques disclosed herein, provided via the application 206. The application 206 may be configured to receive, store, and/or display a network page or other interface for interacting with the service provider computer(s) 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 204 may also contain communications connection(s) 218 that allow the user device(s) 204 to communicate with a stored database, another computing device or server (e.g., the service provider computer(s) 210), user terminals and/or other devices on the network(s) 208. The user device(s) 204 may also include 110 device(s) 220, such as a keyboard, a mouse, a pen, a voice input device, a touch input device, a display, speakers, a printer, etc.

In some aspects, the service provider computer(s) 210 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 210 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 210 may be in communication with the user device(s) 204 and/or other service providers via the network(s) 208 or via other network connections. The service provider computer(s) 210 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 210 may include at least one memory 228 and one or more processing units (e.g., processor(s) 230). The processor(s) 230 may be implemented as appropriate in hardware, computer-executable instructions, firmware, or combinations thereof. Computer-executable instruction or firmware implementations of the processor(s) 230 may include computer-executable or machine-executable instructions written in any suitable programming language to perform the various functions described.

The memory 228 may store program instructions that are loadable and executable on the processor(s) 230, as well as data generated during the execution of these programs. Depending on the configuration and type of service provider computer(s) 210, the memory 228 may be volatile (such as RAM) and/or non-volatile (such as ROM, flash memory, etc.). The service provider computer(s) 210 or servers may also include additional storage 232, which may include removable storage and/or non-removable storage. The additional storage 232 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 228 may include multiple different types of memory, such as SRAM, DRAM, or ROM.

The memory 228, the additional storage 232, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 228 and the additional storage 232 are all examples of computer storage media. Additional types of computer storage media that may be present in the service provider computer(s) 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 210 may contain communications connection(s) 234 that allow the service provider computer(s) 210 to communicate with a stored database, another computing device or server, user terminals and/or other devices on the network(s) 208. The service provider computer(s) 210 may also include I/O device(s) 236, such as a keyboard, a mouse, a pen, a voice input device, a touch input device, a display, speakers, a printer, etc.

Turning to the contents of the memory 228 in more detail, the memory 228 may include an operating system 240, one or more data stores 242, and/or one or more application programs, modules, or services (e.g., the task manager 244, the bot detection engine 246, etc.) for implementing the features disclosed herein.

Figure 4:
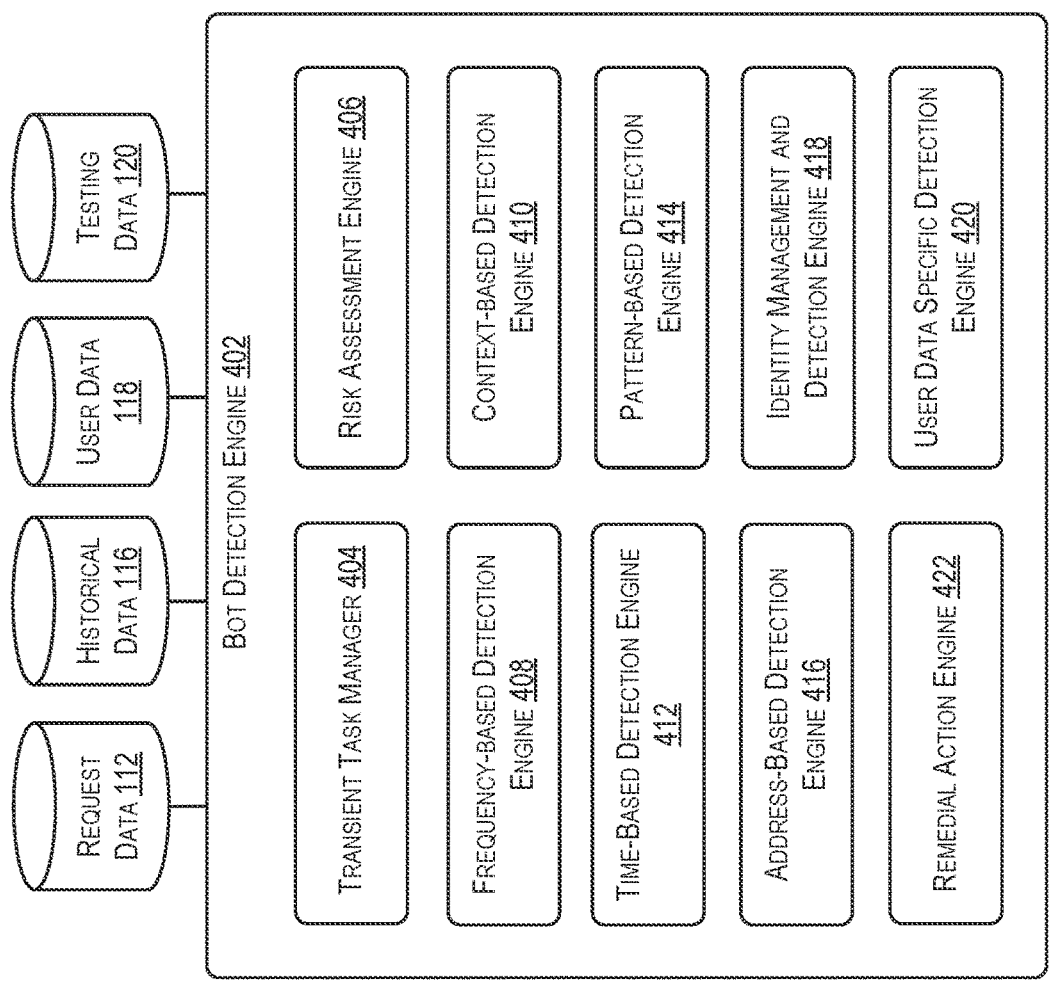
FIG. 4 is an exemplary computer architecture for the bot detection engine, in accordance with at least one embodiment.

FIG. 4 is an exemplary computer architecture 400 for the bot detection engine 402 (an example of the bot detection engine 246 of FIG. 2 and the bot detection engine 114 of FIG. 1), in accordance with at least one embodiment. Bot detection engine 402 may be configured to perform any suitable operation described above with respect to FIGS. 1-3 corresponding to managing tasks and/or detecting bot activity. In some embodiments, the bot detection engine 402 may be configured to perform at least some portion of the functionality discussed above in connection with task manager 244 of FIG. 2. The bot detection engine 402 may include a plurality of modules that may perform functions in accordance with at least one embodiment. As depicted, the bot detection engine 402 includes modules 404-422. The functionality provided by the modules 404-422 is discussed in further detail below. The modules may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for managing data of the type required to make corresponding calculations. In some embodiments, the bot detection engine 402 and/or the task manager 244 of FIG. 2 can be provided as a service or device executed by the service provider computer(s) 210 of FIG. 2 or different computing devices separate from, but communicatively connected to the service provider computer(s) 210.

The bot detection engine 402 may include transient task manager 404. Transient task manager 404 may be configured to manage any suitable aspect of generating transient tasks ("phantom tasks"), deleting transient tasks, processing requests issued for transient tasks, or the like.

By way of example, the transient task manager 404 may be configured to execute operations to generate any suitable number of transient tasks. The transient task manager 404 may label or include an indicator as transient task metadata that indicates the task is to be deleted (e.g., at a predetermined period of time, according to a time period specified in the transient task metadata, etc.) after a relatively short period of time (e.g., after 2 second, 3 seconds, etc.). The transient task manager 404 or any suitable system may be configured to delete the transient tasks according to the indicator and predetermined time period. In some embodiments, the functionality of the transient task manager 404 may be invoked by the task manager 244 of FIG. 2. By way of example, in some embodiments, when an availability request is received (requesting a set of available tasks corresponding to a location), the task manager 244 may identify a set of persistent, legitimate tasks (e.g., task 1 of FIG. 1). In some embodiments, the task manager 244 may invoke the functionality of the transient task manager 404 to additionally generate a number of transient tasks.

In some embodiments, the number of transient tasks may depend at least in part on historical data 116 which may indicate days, time periods, or other conditions during which higher bot activity (bot activity exceeding a threshold amount) has been historically observed. In some embodiments, these days, time periods, or other conditions can be associated with a corresponding confidence indicator (e.g., a confidence score or value) indicating a likelihood that bot activity will occur under the corresponding conditions (e.g., 80% likely) or an amount or percentage of bot requests that are estimated to occur based at least in part on historical data and previously identified bot requests. For example, historical data 116 may indicate that 24% of the expected requests on Sundays, between the hours of 6:00 PM and 9:00 PM are expected to be initiated by bots. The transient task manager 404 may be configured to determine how many transient tasks to generate depending on the likelihood, amount, or percentage of request activity that is expected to be attributed to bots. The transient task manager 404 may be configured to generate a greater number of transient tasks when the likelihood, amount, or percentage of expected bot requests is high (e.g., over a predetermined threshold) versus when those values indicate a low expectation of bot requests (e.g., at or under the predetermined threshold).

The transient task manager 404 may be configured to provide any suitable number of generated transient tasks to the task manager 244 to present via one or more user interfaces of the user device(s) 204 of FIG. 2, or the transient task manager 404 may execute operations to provide the generated transient tasks to the user device(s) 204 directly. In some embodiments, the transient tasks may be generated and provided with the persistent tasks generated by the task manager 244 at any suitable time. In some embodiments, transient tasks may be generated for a particular user device after a determination is made (e.g., by the risk assessment engine 406) that a particular user device is likely (e.g., 60% likely, 75% likely, etc.) to be utilizing a bot, and/or after a predetermined number of task requests that have been attributed to a bot have been received from a given user device (e.g., after the user device has transmitted at least 3 task requests in the last 5 minutes that were determined to be likely initiated by a bot, etc.).

The transient task manager 404 may be configured to store information related to the transient tasks as testing data 120. In some embodiments, the transient task manager 404 maintains record of a unique identifier associated with the transient task. In some embodiments, the transient task may have the same or different (e.g., less) data associated with it than a persistent task generated by the task manager 244. As a non-limiting example, a transient task may be associated with a unique identifier alone. The transient task manager 404 may be configured to receive task requests from the user device(s) 204 that correspond to transient tasks. Receipt of such task requests may cause the transient task manager 404 to determine the task request is initiated by a bot. The transient task manager 404, as well as each of modules 408-420, may be configured to process a task request and provide output (e.g., to risk assessment engine 406) indicating a likelihood that the task request has been issued by a bot. In some embodiments, the output may be in the form of a Boolean value (e.g., 1=the task request was issued/submitted by a bot or 0=the task request was not issued/submitted by a bot), or a value that indicates a confidence or likelihood that the task request was issued/submitted by a bot (e.g., 0.50, 50%, etc.).

The bot detection engine 402 may include risk assessment engine 406. Risk assessment engine 406 may be configured to receive any suitable combination of the outputs provided by the transient task manager 404 and/or modules 408-420. The risk assessment engine 406 may be configured to calculate a probability value (or any suitable value or risk score) that indicates a likelihood that the task request processed by the various modules was initiated/submitted by a bot. In some embodiments, the probability value indicates a likelihood that the task request was initiated by a bot or by an operator (e.g., a human). For example, a value of "0.40" may indicate a 40% probability that the request was issued by a bot and/or a 60% probability that the task request was initiated by a human. The risk assessment engine 406 may utilize a predetermined rule set that identifies which output(s) of one or more modules is to be obtained and utilized when calculating the probability value for a given task response. In some embodiments, the risk assessment engine 406 may be configured to assign weights to the various outputs provided by modules 404 and 408-420 depending on a predetermined scheme. For example, in some embodiments, one output (e.g., the output provided by transient task manager 404) may be weighed more heavily than one or more other outputs provided by modules 408-420.

In some embodiments, the risk assessment engine 406 may store and utilize a number of threshold values and/or conditions that when breached and/or met, cause the risk assessment engine 406 to invoke the functionality of the medial action engine 422. By way of example, if a predetermined threshold is set to 0.80, the risk assessment engine 406 may be configured to invoke the functionality of the remedial action engine 422 upon identifying a probability value (e.g., 0.90) for a given task request that exceeds the threshold of 0.80 (e.g., indicating that there is some degree of confidence or likelihood that the task request was initiated by a bot). Any examples herein in which a probability value is used may likewise use a confidence score (indicating a degree of confidence) or any suitable value, percentage, or range to indicate a likelihood or confidence that a given task request was initiated by a bot.

The bot detection engine 402 may include frequency-based detection engine 408. Frequency-based detection engine 408 may be configured to identify a user device and/or user associated with the task request and determine (e.g., from historical data 118) how often, or how many times the user device and/or user submits task requests. By way of example, the frequency-based detection engine 408 may be configured to determine that the user device has submitted a number (e.g., 2 or more) of task requests (e.g., potentially including the current task request) which were initiated within a threshold period of time with respect to one another (e.g., a threshold period of time that is expected between human initiated task requests). The frequency-based detection engine 408 may utilize predefined rules that include such threshold values and any suitable condition(s) that may be used to determine whether the frequency/regularity or number of task requests is indicative of bot usage. As another example, the rules utilized by the frequency-based detection engine 408 may indicate a user device that issues 20 or more task requests in a one-minute period of time, regardless of the specific time between task requests, is likely executing a bot.

The predefined rules utilized by the frequency-based detection engine 408 may specify the particular calculation or value to be generated as output given any suitable combination of factors such as: 1) the shortest frequency between any two task requests received from a user device, 2) a time period between the current task request and the last task request received, 3) a number of times that a time period between subsequent task requests was less than the threshold period of time expected between human initiated requests, or the like.

As a non-limiting example, the frequency-based detection engine 408 may identify from the historical data 118 that the user device has issued 5 task requests, each initiated one second apart. The determination that any two task sequential task requests were received within a time period that is less than the time period expected between human initiated task requests may be an indication that the task requests were not initiated by a human due to the fact that a human is unlikely to be able to physically submit user input that quickly via the user interfaces provided by application 206 of FIG. 2. In some embodiments, the frequency-based detection engine 408 may be configured to generate a higher value for the likelihood, probability, or confidence value when multiple task requests are received from a user device which breach one or more frequency-based thresholds or meet one or more frequency-based conditions of the predefined rules. The frequency-based detection engine 408 may be configured to provide output (e.g., to the risk assessment engine 404) indicating a likelihood, probability, or confidence that the task request was initiated by a bot.

The bot detection engine 402 may include context-based detection engine 410. The context-based detecting engine 410 may be configured with a predefined set of rules that configure the context-based detecting engine 410 to assess a number of contextual factors and generate a likelihood, probability value, or confidence value indicating whether the task request was initiated by a bot. Contextual factors may include days and/or times during which heavy (or at least increased) bot activity has been historically observed, a number of task requests which were attributed to bot activity during a historical time period, etc.

As another example, the context-based detecting engine 410 may be configured to determine a similarity between the current task request and previously received task requests (from this or other user devices) which were determined to have been initiated by a bot. The degree of similarity may be assessed in any a variety of ways such as utilizing supervised machine learning algorithms, unsupervised learning algorithms, through a comparison of attributes of bot-initiated task requests and the current task request, and the like. As an example, the context-based detecting engine 410 may be configured with an objective function that has been trained using a supervised machine learning algorithm (e.g., a classification algorithm) and a training set in which task request metadata is associated with a label indicating whether the corresponding task request was 1) initiated by a bot, or 2) not initiated by a bot. The objective function (also referred to as a "machine-learning model") can be determined by mapping inputs (e.g., task request metadata) to known outputs (the corresponding labels). Subsequent task metadata can be provided to the machine-learning model and an output label can be generated by the model identifying the task metadata as be initiated by a bot or not being initiated by a bot (or a confidence value corresponding to either). As another example, a clustering algorithm (an example of an unsupervised techniques) may be utilized to group similar task requests together. For example, the clustering algorithm can be executed to group the current task request with 1) task requests that are identified as being initiated by bots, or 2) task requests that have been identified as not being initiated by bot (e.g., initiated by humans).

The bot detection engine 402 may include time-based detection engine 412. The time-based detection engine 412 may be configured with a predefined set of rules that configure the time-based detection engine 412 to analyze a number of time-based factors and generate a likelihood, probability value, or confidence value indicating whether the task request was initiated by a bot. By way of example, the time-based detection engine 412 may identify how often or quickly an assigned task has historically been released/canceled by the user device. For example, the rules utilized by the time-based detection engine 412 may specify that user devices that release/cancel tasks (after requesting and having the task assigned to the user) over a threshold number of times in a predefined time period (e.g., in ten minutes, in 24 hours, etc.), or cancel some percentage (e.g., 70%, 80% of all assigned tasks, etc.), etc. If the current task request is a cancellation of a previously assigned task, and the cancellation is occurring with a threshold period of time since the assignment (e.g., within 5 minutes of the task being assigned), the time-based detection engine 412 may be configured to generate a likelihood, probability value, or confidence score indicating a high likelihood/probability/confidence that the task request was initiated by a bot.

The bot detection engine 402 may include pattern-based detection engine 414. The pattern-based detection engine 414 may be configured with a predefined set of rules that configure the pattern-based detection engine 414 to analyze a number of pattern-based factors and generate a likelihood, probability value, or confidence value indicating whether the task request was initiated by a bot. The predefined set of rules may identify any suitable pattern (e.g., from user data 118) such as canceling one task and then requesting another task associated with a higher compensation amount within a threshold period of time. In some embodiments, the predefined set of rules can identify any suitable patterns associated with driving up compensation prices over time. In some embodiments, compensation amounts for various task associated with a pickup location may vary over time (e.g., based on the items, the remaining number of available tasks of a given day, a length of time during which the task has remained available, a period of time elapsed since an unassigned task was generated, and the like). One or more rules corresponding to patterns/conditions that typically exist when a user or bot is maliciously attempting to cause fluctuations in other task properties. The output generated by the pattern-based detection engine 414 may indicate a higher likelihood/probability/confidence that the task request was initiated by a bot when one or more of such patterns are identified.

The bot detection engine 402 may include address-based detection engine 416. The address-based detection engine 416 may be configured with a predefined set of rules that configure the address-based detection engine 416 to analyze a number of address-based factors and generate a likelihood, probability value, or confidence value indicating whether the task request was initiated by a bot. In some embodiments, the address-based detection engine 416 may be configured to determine whether an IP address associated with a given task request is common to one or more historic task requests (e.g., one or more task requests of historical data 116). In some embodiments, the address-based detection engine 416 may be configured to produce output indicating the task request was likely initiated by a bot when the number of task requests that share an IP address (e.g., total, or in a given period of time) exceed a predefined threshold. In some embodiments, the address-based detection engine 416 may determine whether requests that share an IP address, user identifier, or user device identifier were initiated for largely disparate locations. For example, an IP address, user, or user device that is both associated with a task request for a task based in City C and a task request associated with a task associated with City D, a location 500 miles away from City C (or any two locations that exceed a threshold distance apart), may be identified as being indicative that the task request was issued by a bot and the output generated by the address-based detection engine 416 may reflect the same.

The bot detection engine 402 may include identity management and detection engine 418. The identity management and detection engine 418 may be configured with a predefined set of rules that configure the identity management and detection engine 418 to analyze a number of identity-based factors and generate a likelihood, probability value, or confidence value indicating whether the task request was initiated by a bot. The identity management and detection engine 418 may be configured to maintain, issue, and/or verify user credentials and/or digital signatures of task requests. In some embodiments, the user device may be issued a credential (e.g., a certificate) by the identity management and detection engine 418 or a trusted certificate authority separate from the identity management and detection engine 418. In some embodiments, the application 206, during a registration process may generate a public/private key pair which are generated such that data encrypted with one, may be decrypted with the other. The application 206 may be configured to provide the public key to the certificate authority (or the identity management and detection engine 418) and a certificate may be issued in return. The certificate may include the public key as digitally signed using the private key of the certificate authority. The application 206 may be configured to transmit task requests which are digitally signed with the private key associated with the user device. The task request may include the certificate issued by the certificate authority. The identity management and detection engine 418, if not acting as the certificate authority, may be provided the public key of the certificate authority and may be configured to verify task requests by obtaining the public key for the user device from the certificate using the certificate authority's public key. The public key for the user device may be then used by the identity management and detection engine 418 to verify the digital signature of the task request to determine whether the task request has been altered and whether the task request was sent by the user device that generated the digital signature. In some embodiments, the identity management and detection engine 418 may be configured to outright reject the task request (e.g., when the digital signature verification fails, or an improper certificate was included, or not included at all, etc.), or the identity management and detection engine 418 may be configured to output data indicating the task request is likely to have been initiated by a bot (e.g., when the digital signature verification fails, or an improper certificate was included, or not included at all, etc.).

The bot detection engine 402 may include user data specific detection engine 420. The user data specific detection engine 420 may be configured with a predefined set of rules that configure the user data specific detection engine 420 to analyze a number of user data specific factors and generate a likelihood, probability value, or confidence value indicating whether the task request was initiated by a bot. By way of example, the user data specific detection engine 420 may access any suitable user data (e.g., user data 118) to obtain and/or calculate a length of time since the user first requested a task, a frequency/regularity at which the user completes tasks, a number of tasks completed by the user, whether the user completes tasks within a threshold time period of the expected end time associated with the task, customer complaints and/or compliments associated with historic tasks executed by the user, past timeliness associated with the user showing up at the expected start time (or within a threshold of the expected start time), and the like. As a non-limiting example, the rules employed by the user data specific detection engine 420 may cause the user data specific detection engine 420 to generate output that indicate a higher likelihood/probability/confidence that the task request was initiated by a bot when the user fails to complete tasks (at all, or within the expected time range associated with the tasks), when the user has over a threshold number of customer complaints, and/or when the user is known to show up after the expected start time.

The bot detection engine 402 may include remedial action engine 422. The remedial action engine 422 may be configured to receive output (e.g., a likelihood value, a probability value, a confidence value) from the risk assessment engine 406 indicating the task request is likely to have been initiated by a bot. In response, the remedial action engine 422 may be configured to automatically deny one or more subsequent requests from the corresponding device, cause properties of the subsequent tasks provided to the user device to be different from what would otherwise be provided (e.g., reduce a compensation amounts, provide tasks with longer time durations, provide tasks with relatively lengthy associated routes, select tasks with a greater number of sub-tasks, or otherwise diminish the overall benefits of the tasks provided to the user request for selection), or the like. In some embodiments, the remedial action engine 422 may continue with denying (all or some portion) of the task requests submitted by a user device for a predetermined period of time. The remedial action engine 422 may be configured to lessen the amount of denied task requests over time, so long as another bot-initiated task request has not been identified in the interim.

In some embodiments, the remedial action engine 422 can trigger or otherwise execute instructions that cause the transient task engine 404 to provide transient tasks to the user device in response to future task requests. As another example, the remedial action engine 422 can modify any suitable aspect of the task requests provided to a user device suspected of bot activity. By way of example, the remedial action engine 422 may reduce a compensation amount for a given task provided to a user device that is suspected of bot usage, while providing a different compensation amount for the task when provided to other user devices that are not suspected of bot usage. In some embodiments, bots that may select particular tasks based on the particular properties of the task may be less likely to request any task (or at least fewer tasks) due to the less beneficial task properties assigned to the tasks provided to that device.

Figure 5:
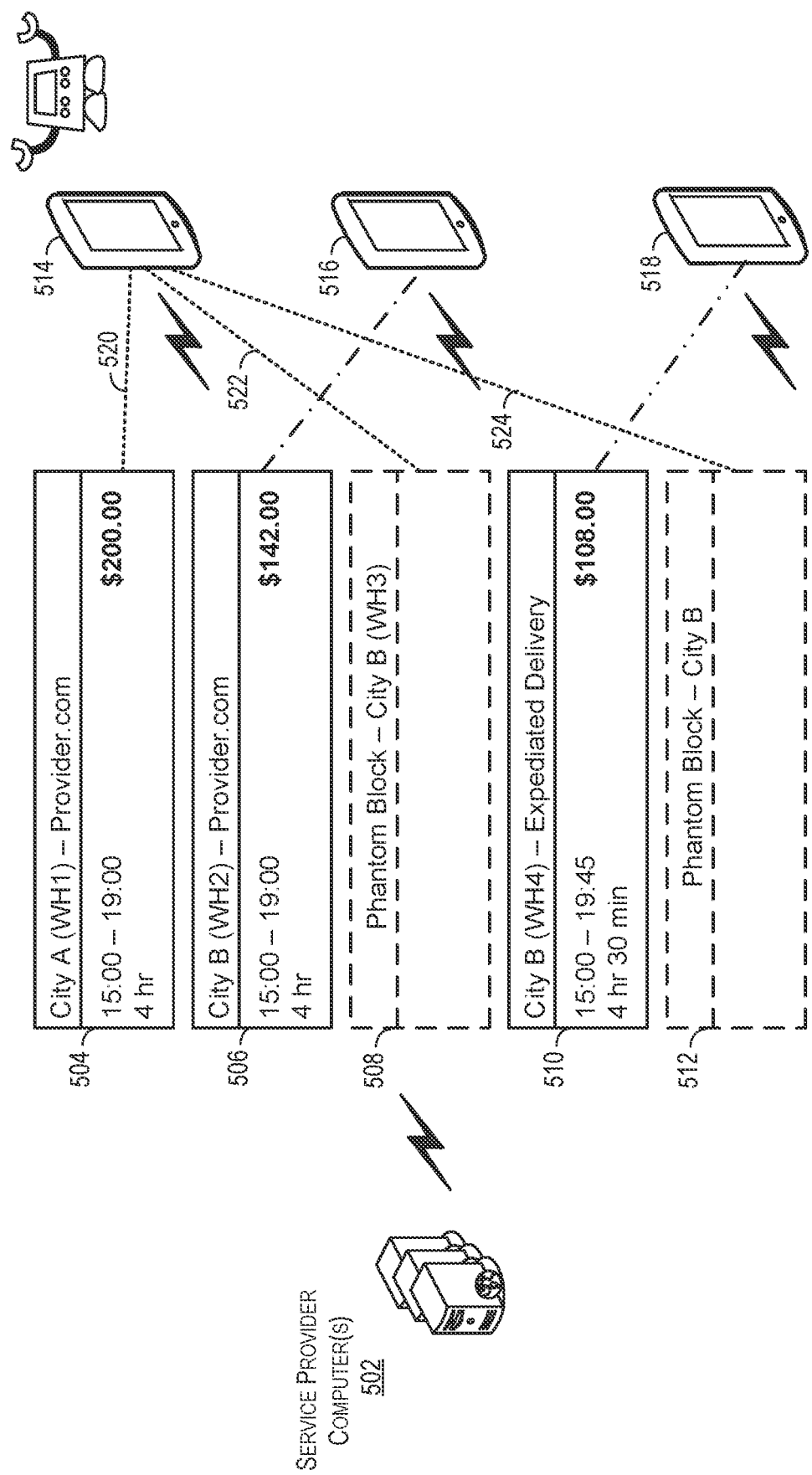
FIG. 5 illustrates a method for detecting bot usage associated with one or more user devices utilizing one or more phantom blocks, in accordance with at least one embodiment.

FIG. 5 illustrates a method 500 for detecting bot usage associated with one or more user devices utilizing one or more phantom blocks, in accordance with at least one embodiment. The operations of method 500 may be performed by the service provider computer(s) 502 (examples of the service provider computer(s) 210 of FIG. 2 and 102 of FIG. 1). In some embodiments, the operations discussed in connection with method 500 may be executed by the transient task engine 404 of FIG. 4, operating in whole or in part at the service provider computer(s) 510 or a device separate from the service provider computer(s) 502.

In some embodiments, the service provider computer(s) 502 (e.g., the task manager 244 of FIG. 2) may execute operations to provide a set of tasks to one or more user devices (e.g., user devices 514-518, each an example of the user device(s) 204 of FIG. 2). The tasks provided to user devices 514, 516, and/or 518 can be the same or different from the tasks provided to other user devices. In some embodiments, each user device may transmit a task availability request that is associated with one or more locations. The service provider computer(s) 502 may select tasks corresponding to those location(s) (and potentially match various preferences submitted in the task availability request corresponding to days, times, or other preferred task properties). The user devices in the example depicted in FIG. 5 may be presumed to have requested available tasks associated with a number of locations corresponding to "City A," "City B," and "City C," as indicated in FIG. 5.

In some embodiments, the service provider computer(s) 502 (e.g., the transient task manager 404 of FIG. 4) may execute instructions to cause a number of phantom tasks (e.g., phantom tasks 508 and 512, examples of the transient tasks discussed above) to be provided to the user devices 514-518, along with legitimate tasks 504, 506, and 510. In some embodiments, the service provider computer(s) 502 may be configured to provide only legitimate tasks until a user device is suspected of bot usage. Thus, in some embodiments, the service provider computer(s) 502 (e.g., the task manager 244) may provide tasks 504, 506, and 512 in response to corresponding task availability requests submitted by user devices 514-518.

The particular tasks provided to each device may depend on the locations associated with the task availability request. By way of example, the user of user device 516 may register for tasks associated with a particular location (e.g., City B (DWA6), corresponding to a particular pickup location). An application running on user device 516 (e.g., application 206 of FIG. 2) may be configured to periodically request available tasks for that location and present the task metadata associated with the tasks received from the service provider computer(s) 502.

As task requests are received from the user devices 514-518, each task request may be processed by the service provider computer(s) 502 (e.g., the bot detection engine 402 of FIG. 4). In some embodiments, detecting likely bot usage may result in executing instructions that cause the service provider computer(s) 502 to later provide phantom blocks 508 and/or 512. In some embodiments, phantom blocks 508 and/or 512 may only be provided to user devices for which bot usage is suspected. By way of example, for at least one of the factors discussed in connection with FIG. 4, user device 514 may be suspected of bot activity. In response to a subsequent task availability request transmitted by the user device 514 (due to a predetermined frequency/regularity at which the user device 514 is configured to poll for available task requests, in response to user input, or the like), phantom blocks 508 and/or 512 may be provided to the user device 514. Phantom block 508 may be associated with any suitable data (e.g., a task identifier, a time period, a location, etc.) that may be used to trick a potential bot into submitting a request for a task (e.g., a transient task) corresponding to the phantom block 508. Phantom block 512 can be associated with similar, but different data, that likewise, can be used to trick bot(s) into submitting a request for a task (e.g., a transient task) corresponding to the phantom block 508.

As discussed in connection with FIG. 4, the service provider computer(s) 502 (e.g., the bot detection engine 402) may utilize a request for a phantom block as at least a factor in determining a likelihood/probability/confidence that a given task request was initiated by a bot. The service provider computer(s) 502 can utilize the suspicion of bot activity by user device 514 in order to deny future task requests, modify properties of the tasks provided to the user device 514, or modify aspects of the manner in which tasks are selected for user device 514.

As a non-limiting example, tasks 504, 506, and 510 may be provided to user device 514 based at least in part on one or more task availability requests transmitted by the user device 514 to service provider computer(s) 502. These tasks may individually be associated with potentially different locations. As a non-limiting example, task 504 may be associated with "City A," task 506 may be associated with "City B," Phantom block may be associated with "City B," and task 510 may be associated with City C. In some embodiments, each task may be associated with a particular location identifier such as a warehouse identifier. For example, a task may be associated with "City A" and "WH1," as depicted in FIG. 5. At any suitable time, the user device 514 may transmit a task request at 520 for task 504 requesting that the task 504 be assigned to the user device 514 and/or the user associated with user device 514. The task request transmitted at 520 may be received and processed by the various modules of the bot detection engine 402 operating at service provider computer(s) 502. In some embodiments, the bot detection engine 402 may determine, based on the various factors described above, that there is relatively little risk that the user device 514 is using a bot.

Later, the user device 514 may transmit a task request at 522 requesting that a task associated with phantom block 508 be assigned to the user device and/or the user associated with the user device 514. Receipt of the request for a transient task associated with phantom block 508 may cause service provider computer(s) 502 (e.g., transient task manager 404) to determine a likelihood/probability/confidence that task request transmitted at 522 was initiated by a bot (or that the user device 514 is utilizing a bot in general). The likelihood/probability/confidence value determined with respect to the task request transmitted at 522 may be higher than the one determined with respect to the task request transmitted at 520.

As a result of the likelihood/probability/confidence value determined with respect to the task request transmitted at 522 breaching a predefined threshold, the service provider computer(s) 502 may provide (at any suitable time, in response to the next task availability request from user device 514) phantom block 512. In some embodiments, the user device 514 may transmit a request for the phantom block 512 at 524. Receipt of the request for a transient task associated with phantom block 512 may cause service provider computer(s) 502 (e.g., transient task manager 404) to determine a likelihood/probability/confidence that task request transmitted at 524 was initiated by a bot (or that the user device 514 is utilizing a bot in general). The likelihood/probability/confidence value determined with respect to the task request transmitted at 524 may be higher than the one determined with respect to the task requests transmitted at 522 and 520. In some embodiments, the service provider computer(s) 502 may determine the likelihood/probability/confidence value determined with respect to the task request transmitted at 524 breaches a predefined threshold and some portion (e.g., all, 90%, 75%, etc.) of subsequent requests received from user device 514 may be automatically denied (e.g., for all time, for a particular time period, etc.). However, aspects of those denied requests may still be utilized for determining likelihood/probability/confidence value indicating whether or not the request was initiated by a bot (or the user device 514 is likely using a bot). The service provider computer(s) 502 may be configured to lessen the number/percentage of requests from user request 514 that are automatically denied over time (e.g., when no additional task requests are received which are suspect to have been initiated by a bot, based solely on a predefined passage of time, or the like).

Figure 6:
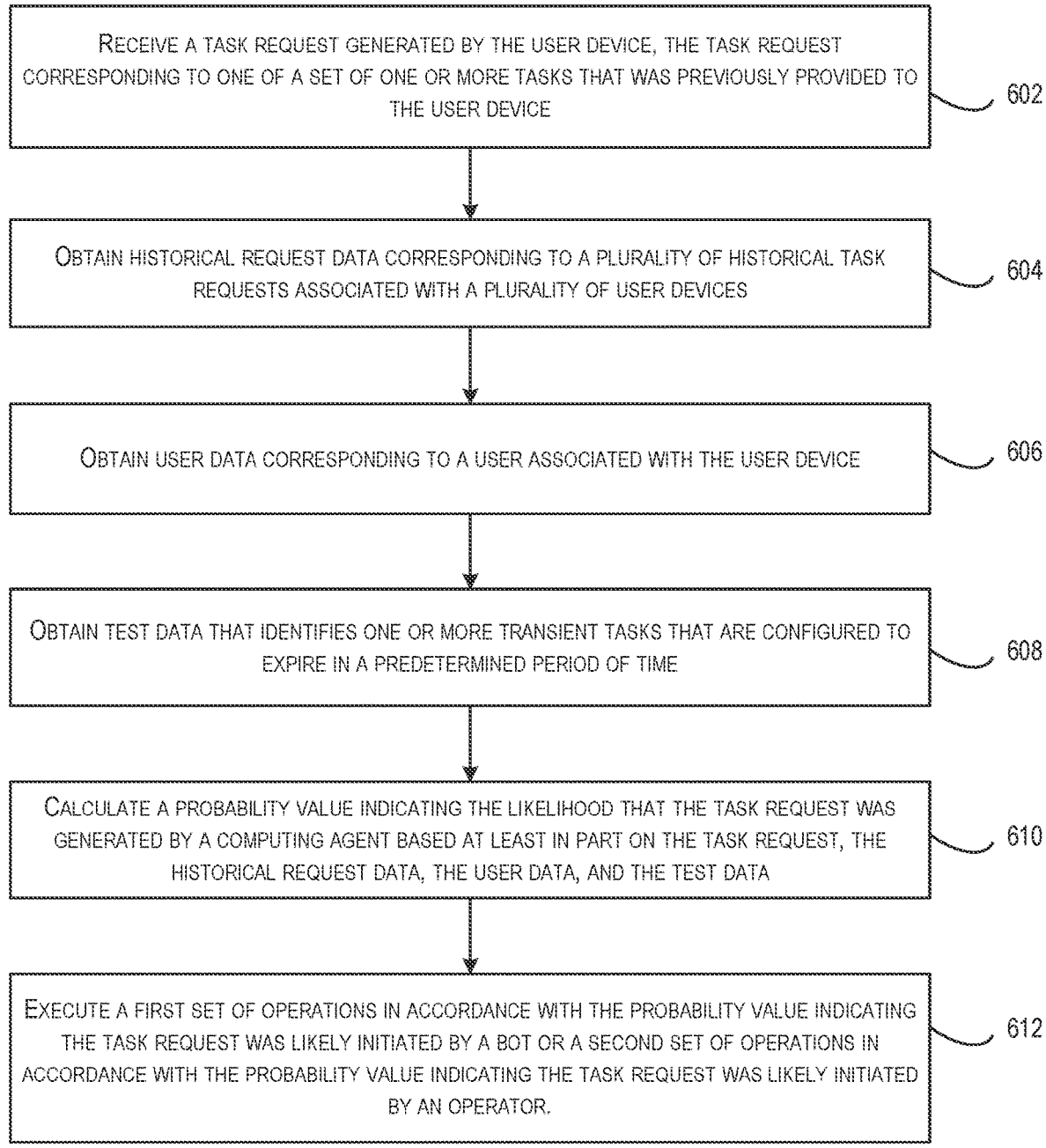
FIG. 6 is a flowchart illustrating an example method for detecting bot usage, in accordance with at least one embodiment.

FIG. 6 is a flowchart illustrating an example method for detecting bot usage, in accordance with at least one embodiment. The method 600 may be performed by a computing device (e.g., one or more computing devices of service provider computer(s) 210 of FIG. 2). The computing device may include one or more processors, and one or more memories storing computer-executable instructions that, when executed with the one or more processors, cause the computing device to perform the operations of method 600. In some embodiments, the operations of method 600 may be performed by an application, service, or program associated with a service provider.

The method 600 may begin at 602, where a task request may be received. The task request may be generated by a user device (e.g., one of the user devices 514-518 of FIG. 5). In some embodiments, the task request may correspond to one of a set of tasks (e.g., one or more tasks) that were previously provided to the user (e.g., tasks 504, 506, and 510 of FIG. 5). By way of example, task metadata associated with tasks 504, 506, and 510 may be provided to and presented at the user device.

At 604, historical request data (e.g., historical data 116 of FIGS. 4 and 1) corresponding to a plurality of historical task requests associated with a plurality of user devices may be obtained.

At 606, user data (e.g., user data 118 of FIGS. 4 and 1) corresponding to a user associated with the user device may be obtained.

At 608, test data (e.g., testing data 120 of FIGS. 4 and 1) that identifies one or more transient tasks that are configured to expire in a predetermined period of time.

At 610, a probability value indicating the likelihood that the task request was generated by a computing agent may be calculated based at least in part on any suitable combination of the task request, the historical request data, the user data, and/or the test data.

At 612, a first set of operations can be executed in accordance with determining that the probability value indicates the task request was likely initiated by a bot, or a second set of operations in accordance with determining that the probability value indicates the task request was likely initiated by an operator (e.g., a human). By way of example, the first set of operations can be associated with denying one or more subsequent task requests received from the user device and/or modifying one or more aspects of subsequent task requests provided to the user device, or any suitable remedial action or operation discussed herein. The first set of operations may be different from the second set of operations that are executed when the task request is determined to be initiated by an operator (rather than a bot). In some embodiments, the first set of operations may constitute a deviation from previous implementations of workflow management (e.g., associated with the second set of operations).

Figure 7:
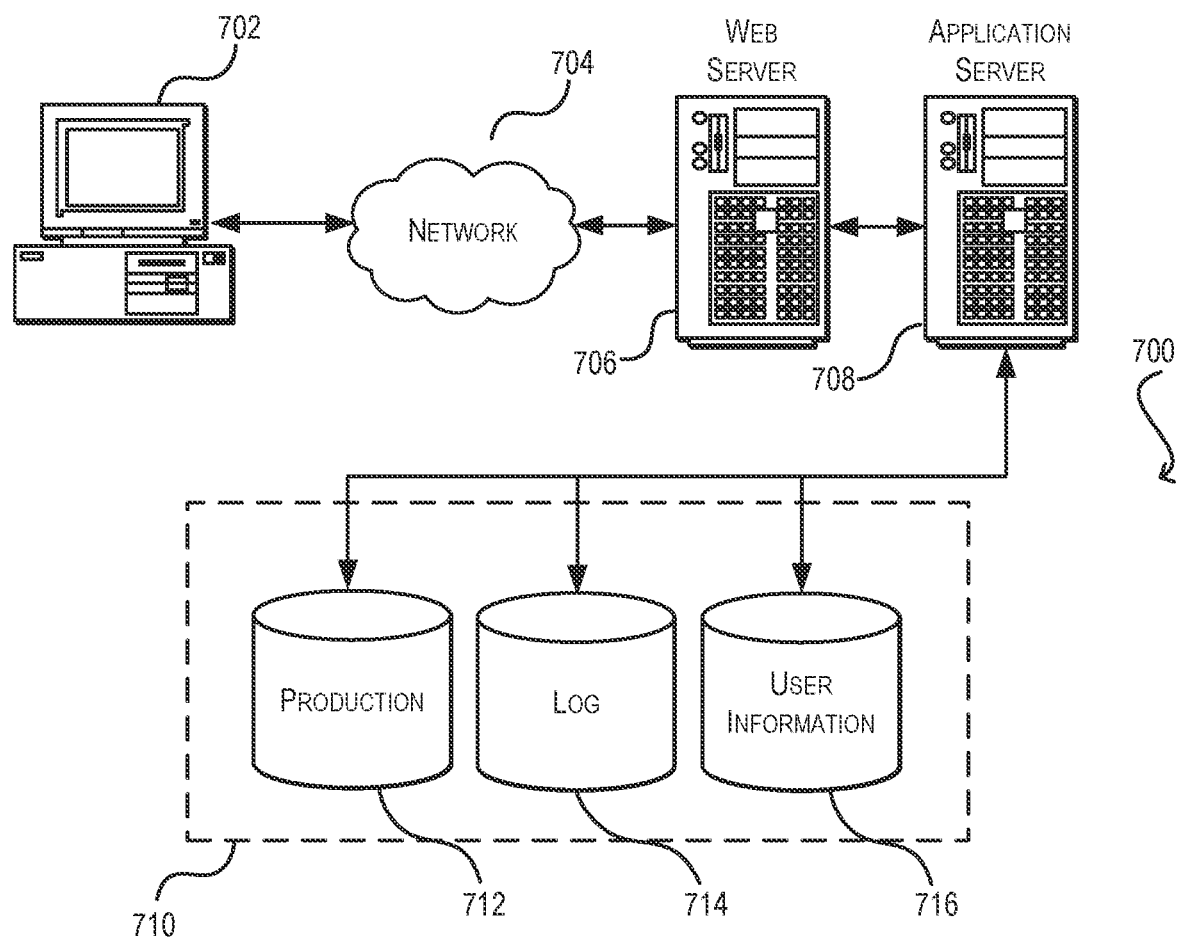
FIG. 7 is a schematic diagram illustrating an environment in which various embodiments can be implemented.

FIG. 7 is a schematic diagram illustrating an environment 700 in which various embodiments can be implemented. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform sub-tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computing device from a user device, a first request corresponding a location, the first request being associated with requesting potential tasks associated with the location;
    identifying, by the computing device, a set of tasks corresponding to the location, the set of tasks comprising 1) a persistent task that is valid until assigned to a respective user and 2) a transient task that is valid for a predetermined time period;
    providing, by the computing device to the user device, the set of tasks in response to the first request;
    receiving, by the computing device, a task request generated by the user device, the task request corresponding to one of the set of tasks that was provided to the user device;
    obtaining, by the computing device, historical request data corresponding to a plurality of historical task requests associated with a plurality of user devices;
    obtaining, by the computing device, user data corresponding to a user associated with the user device;
    calculating, by the computing device, a probability value that indicates a likelihood that the task request was: 1) generated in response to user action, or 2) generated by a computing agent that is configured to simulate human activity, the probability value being calculated based at least in part on 1) determining whether the task request corresponds to the transient task and 2) at least one of: the historical request data or the user data corresponding to the user;
    in accordance with determining that the probability value is below a predetermined threshold indicating a low likelihood that the user device is utilizing the computing agent, performing, by the computing device, a first set of operations that are associated with legitimate requests; and
    in accordance with determining that the probability value is above the predetermined threshold indicating a high likelihood that the user device is utilizing the computing agent, performing, by the computing device, a second set of actions that are associated with fraudulent requests.

2. The computer-implemented method of claim 1, wherein the set of tasks comprise: 1) a first subset of persistent tasks that are valid until assigned to the user, and 2) a second subset of transient tasks that are individually valid for the predetermined time period.

3. The computer-implemented method of claim 2, further comprising individually deleting the second subset of transient tasks upon expiration of the predetermined time period.

4. The computer-implemented method of claim 3, wherein calculating the probability value is based at least in part on identifying that the task request corresponds to one of the second subset of transient tasks.

5. The computer-implemented method of claim 1, wherein the second set of actions comprises:

providing, by the computing device, a second transient task to the user device, the second transient task being configured to expire after the predetermined time period;
    monitoring, by the computing device, subsequent task requests received from the user device;
    identifying, by the computing device, that at least one of the subsequent task requests received from the user device corresponds to the second transient task provided to the user device; and
    generating, by the computing device, a second probability value indicating an increased likelihood that the user device is utilizing the computing agent.

6. The computer-implemented method of claim 1, further comprising:
    identifying that the historical request data indicates a recurrent time period during which computing agent usage has been historically identified at a higher frequency than other recurrent time periods; and
    determining, by the computing device, that the task request was received at a time corresponding to the recurrent time period, wherein the probability value is calculated based at least in part on determining that the task request was received at the time corresponding to the recurrent time period.

7. A computing device, comprising:
    one or more processors; and
    one or more memories comprising computer-executable instructions that, when executed with the one or more processors, cause the computing device to:
        providing a set of tasks individually associated with a corresponding set of sub-tasks, the set of tasks comprising a persistent task that is valid until assigned to a respective user and a transient task that is valid for a predetermined time period;
        receiving, from a user device, a task request corresponding to the transient task;
        based at least in part on receiving the task request corresponding to the transient task, calculating a probability value that indicates a likelihood that the task request was generated by a computing agent that is configured to simulate human activity, the probability value being calculated based at least in part on determining whether the task request is the transient task; and
        based on the probability value, performing one or more actions associated with 1) rejecting at least one subsequent task request from the user device or 2) modifying at least one persistent task subsequently provided to the user device.

8. The computing device of claim 7, wherein the persistent task is configured to persist as an available task until assigned to the user device, and wherein the transient task is configured to be deleted after the predetermined time period.

9. The computing device of claim 7, wherein providing the transient task in the set of tasks is based at least in part on calculating a second probability value indicating that a previous task request transmitted by the user device was likely to have been initiated by the computing agent configured to simulate human activity.

10. The computing device of claim 7, wherein the probability value that indicates the likelihood that the task request was generated by the computing agent is calculated further based at least in part on identifying at least one of: a first frequency at which the user device has submitted sequential task requests, a second frequency at which the user device submits cancellations to associated with previously assigned tasks, a time period between receipt of the task request and a previous time at which a previous task request was received.

11. The computing device of claim 7, wherein the probability value that indicates the likelihood that the task request was generated by the computing agent is calculated further based at least in part on determining a time period between receiving, from the user device, a first historical task request requesting assignment of a historical task and a second historical task request requesting cancellation of the assignment of the historical task.

12. The computing device of claim 7, wherein the probability value that indicates the likelihood that the task request was generated by the computing agent is calculated further based at least in part on determining a time period identified from historical data as being one during which increased fraudulent requests associated with computing agents has been historically detected.

13. The computing device of claim 12, wherein the probability value that indicates the likelihood that the task request was generated by the computing agent is calculated further based at least in part on identifying one or more patterns from the task request and one or more historical task requests received from the user device.

14. A computer-readable storage medium having one or more memories storing computer-executable instructions that, when executed with one or more processors of a computing device, causes the one or more processors to:
provide, to a user device, a set of tasks individually associated with a corresponding set of sub-tasks;
receive, from the user device, a task request corresponding to one of the set of tasks provided to the user device;
based at least in part on receiving the task request, calculate a probability value that indicates a likelihood that the task request was generated by a computing agent that is configured to simulate human activity;
based at least in part on the probability value, present a transient task to the user device;
receive a subsequent task request corresponding to the transient task; and
in accordance with determining the subsequent task request corresponds to the transient task, execute one or more operations comprising at least one of: 1) denying at least one subsequent task request from the user device or 2) modifying at least one subsequent task provided to the user device.

15. The computer-readable storage medium of claim 14, wherein each task is associated with at least two of: a task identifier, a start time, an expected end time, one or more sub-tasks, a location identifier, a delivery route, or a compensation amount.

16. The computer-readable storage medium of claim 14, wherein calculating the probability value is based at least in part on a number of instances a user associated with the user device has completed historical tasks, a percentage of historical tasks timely completed by the user, and a set of reviews associated with the user.

17. The computer-readable storage medium of claim 14, wherein executing the computer-executable instructions further causes the one or more processors to:
identify the task request as being associated with an Internet Protocol (IP) address that was also associated with a previously received task request; and
identifying that a first location corresponding to the task request and a second location corresponding to the previously received task request exceeds a predetermined threshold distance.

18. The computer-readable storage medium of claim 14, wherein modifying the at least one subsequent task further comprises generate a decreased compensation amount from an original compensation amount associated with the subsequent task, wherein the decreased compensation amount provided to the user device is lower than the original compensation amount associated with the subsequent task.

19. The computer-readable storage medium of claim 14, wherein the one or more operations comprises denying a plurality of subsequent tasks, and wherein a frequency at which the subsequent tasks are denied is reduced over time.

20. The computer-readable storage medium of claim 19, wherein calculating the probability value is based at least in part on identifying a similarity between the task request and historic task requests associated with bot activity.

* * * * *